H. FACHS.
MACHINES FOR RAISING OR FLANGING THE EDGE OF SHEET-METAL.
No. 7,849. Reissued Aug. 14, 1877.
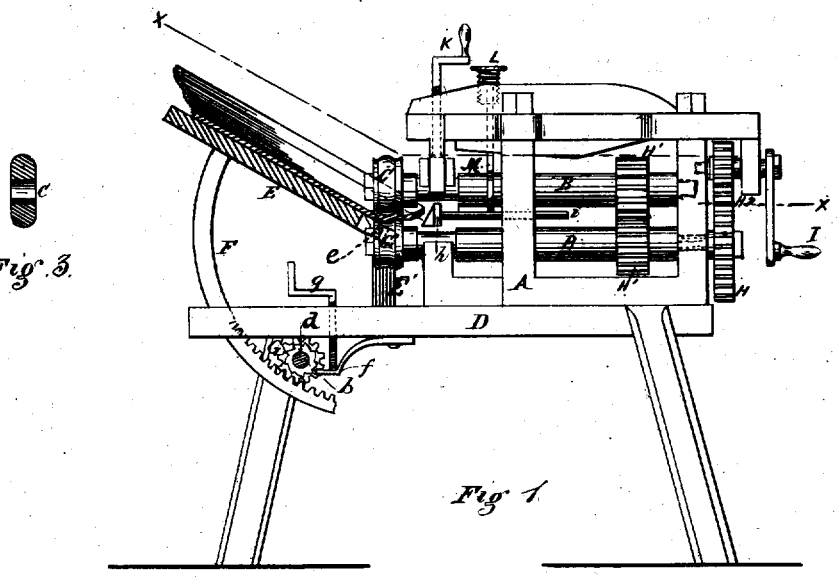
Fig. 3.
Fig. 1
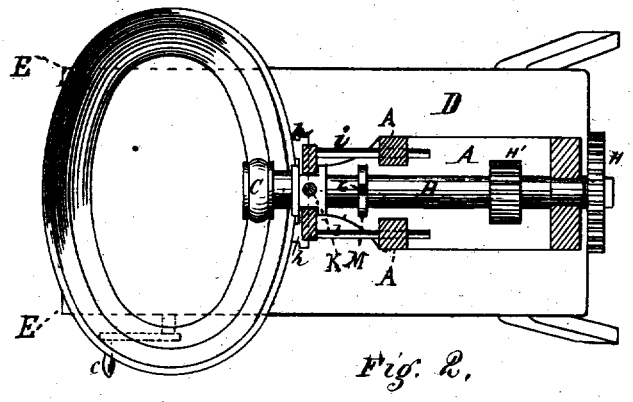
Fig. 2.
Witnesses
Francis L. Clark
Erwin Bartlugu
Inventor Henry Fachs
By Attorney Wm. H. Smithhart
N. PETERS, PHOTO-LITHOGRAPHER, WASHINGTON, D. C.

UNITED STATES PATENT OFFICE.

HENRY FACHS, OF NEW YORK, N. Y.

IMPROVEMENT IN MACHINES FOR RAISING OR FLANGING THE EDGE OF SHEET METAL.

Specification forming part of Letters Patent No. 44,945, dated November 8, 1864; Reissue No. 7,849, dated August 14, 1877; application filed June 13, 1877.

*To all whom it may concern:*

Be it known that I, HENRY FACHS, of the city, county, and State of New York, have invented a new and Improved Machine for Raising or Flanging the Edge of Sheet Metal; and I hereby declare that the following is a full, clear, and exact description thereof, which will enable others skilled in the art to make and use the same, reference being had to the accompanying drawing, forming part of this specification.

My invention relates to an improved method and machine for turning up, raising, or flanging the edge of sheet-metal blanks; and it has for its object the rapid forming of a flange on such blanks.

It consists, first, of the method of forming the flange—that is to say, turning up, raising, or flanging the edge of a sheet-metal blank by clasping it between a pair of rolls, gradually elevating the blank outside of the rolls to the desired angle while rotating the blank by means of the rolls.

Second. It consists in the combination of a tilting platform or table and a pair of flanging-rolls, said table being actuated so as to move upward in the arc of a circle, as hereinafter described, and the rolls to clasp the edge of a metal blank and rotate it.

Third. It consists in the arrangement of revolving flanging-rolls, a cogged segment, which is permanently attached to a pivoted table, and of suitable gearing which imparts motion to said segment, and so raises the table to an angle with the axis of the rolls, so that the metal blank is gradually bent at the point hereinafter described as the bending-point.

This I accomplish by the combination of two arbors geared together; suitable gear-wheels to impart motion to them; rolls which are attached to the front projecting ends of said arbors, and revolve with them; a swinging or tilting platform or table located in front of the rolls, so pivoted in bearings that it can be raised to an inclination or angle to the longitudinal axis of the rolls in such a manner that the body of the blank (which rests upon said table) can be gradually brought from a horizontal to an inclined position or angle, while its edge is exposed to the action of the flanging-rolls; a cogged segment attached to said table, by which it is moved; a pinion and shaft, which actuate said segment; a ratchet-wheel and pawl, which prevent back movement of said pinion and shaft when the table is being raised; stops or guides, which guide the metal blank when being worked, and also determine the width of the rim or flange; a hand-screw for holding the upper arbor down, and a device for raising said arbor, in order that the rolls may be adjusted to the thickness of the metal; two winches, one for imparting motion to the arbors, and the other to the table, all of which are illustrated in detail in the drawings, in which—

Figure 1 represents a sectional side elevation of the invention; Fig. 2, a sectional plan or top view of the same, the plane of section being indicated by the line *x x*, Fig. 1. Fig. 3 is a detached section of one of the raising-rolls.

Similar letters of reference indicate like parts.

A represents a frame of metal firmly attached to the top of bench or bed plate D. It forms the bearings for the arbors B B and other parts, as hereinafter mentioned.

B B are two horizontal arbors geared together by pinions, so that the rolls attached to or mounted on them rotate in opposite directions with uniform speed, $H^1$ $H^1$ being the two gear-wheels which connect said arbors. H is a large gear-wheel on the rear end of the lower arbor, outside of its bearings in A. Meshing into wheel H is a pinion, $H^2$, which is fast on a short shaft, having its journals, as shown in Fig. 1, just above the rear journal of the upper arbor. Said shaft and pinion are rotated by the winch I, and the motion so imparted is conveyed to the rolls on the arbors B B. The upper arbor is so arranged that it can be raised from or depressed to the lower arbor, K being a hand-screw, by which it is held down on the sheet metal when it is being worked between the rolls. L is a vertical rod provided with a spring under its head, and a ring or collar, M, attached to its lower end. Said collar loosely encircles the upper arbor, as shown in Fig. 1. By this collared and headed rod and the spring said arbor is raised. C C are two flanging rollers, secured to the front projecting ends of the arbors B B by suitable nuts or other means, so that they can be readily taken off and replaced by others of a different shape.

B is a bench, to which the frame A is secured. Two standards, E′, rise from this bench, one on each side of the rolls C C, and form the bearings for the gudgeons *e* of the tilting table. E is said table, which is situated immediately in front of the rolls, and is pivoted at each end of the side next the rolls by its gudgeons, which journal in the standards E′, so that in turning on said gudgeons it can be raised to an angle or inclination with the axis of the rolls, whereby the body of the blank, when being flanged, is caused to move in the arc of a circle whose center is in a point where a vertical line drawn through the face-axes of the rolls would cross a horizontal transverse line drawn through the thickness of that portion of the blank which is in line with the face of the rolls. This point may also be termed the bending-point of the blank. F is a cogged segment, securely attached to and extending down from the bottom of said platform, into the teeth of which mesh the cogs of the pinion G, located under the bench or bed-plate D. Said pinion is fast on the shaft *b*, which is journaled in suitable bearings, and is rotated by the winch *c*, Fig. 2. Said shaft and pinion are prevented from any back movement by the ratchet-wheel *d* on the shaft *b*, the teeth of which are engaged by the pawl *f*. Said pawl can be disengaged by the screw *g* when it is desired to lower the table E.

On each side of the rolls are the stops or guides *h*, which are mounted on the horizontal rods *i i*, which pass horizontally through frame A at each side of the arbors, as shown in Fig. 2. Said rods are adjustable, so that the stops or guides may be moved out or in to determine the width of the desired rim or flange.

Operation: The blank to be raised or flanged is cut out into the desired form and size, and placed on the table; its edge is then inserted between the rolls. The upper arbor being down, the edge is clasped between the rolls, which are made to press upon this portion of the blank by screwing down the screw K. The flanging-rolls are then put in motion, and as they revolve their friction on the edge of the blank causes it to revolve, or carries it round on the table, with its edge constantly bearing against and guided by the stops *h*, which have previously been adjusted to determine the width of the proposed rim or flange.

Motion being imparted to the shaft *b*, it is conveyed to the table through the gearing and cogged segment, causing the table to gradually move upward to the position shown in the drawing, or to such position as the angle of the rim or flange may demand. By this action of the table the body of the blank resting upon it is caused to gradually move upward in the arc of a circle, as before described, while its edge is clasped between and exposed to the action of the rolls. Thus a rim or flange is formed on sheet-metal articles of any shape other than those having square corners without the use of the hammer, and with but little labor.

Having thus described my invention and its operation, what I claim, and desire Letters Patent for, is—

1. As an improvement in the method of flanging sheet-metal blanks, the method hereinbefore described—that is to say, clasping the edge of the blank between a pair of rolls, and then rotating the blank by means of the rolls, and gradually elevating the main portion of the blank, which is outside of the rolls from the plane of its contact with the rolls into a plane at an angle therewith, so that a flange is formed on the blank by the action of the rolls and the upward movement of the body of the blank, substantially as set forth.

2. In combination with the flanging-rolls, the tilting platform, operating in manner as described, and for the purpose set forth.

3. The combination, with flanging-rolls, of a cogged segment attached to a tilting table, and of gearing for operating the segment, whereby the table is raised to an angle with the axes of the flanging-rolls, as and for the purpose set forth.

HENRY FACHS.

Witnesses:
WM. M. CUTHBERT,
W. KUFFNER.